US011913399B2

(12) United States Patent
Wagner et al.

(10) Patent No.: US 11,913,399 B2
(45) Date of Patent: Feb. 27, 2024

(54) METHOD FOR ADJUSTING A FUEL MASS TO BE INJECTED

(71) Applicant: Robert Bosch GmbH, Stuttgart (DE)

(72) Inventors: Alexandre Wagner, Stuttgart (DE); Benedikt Alt, Heimsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/295,172

(22) Filed: Apr. 3, 2023

(65) Prior Publication Data

US 2023/0323830 A1 Oct. 12, 2023

(30) Foreign Application Priority Data

Apr. 6, 2022 (DE) ..................... 10 2022 203 409.0

(51) Int. Cl.
*F02D 41/18* (2006.01)
*F02D 41/14* (2006.01)

(52) U.S. Cl.
CPC ....... *F02D 41/182* (2013.01); *F02D 41/1401* (2013.01); *F02D 41/1454* (2013.01); *F02D 2041/1432* (2013.01); *F02D 2041/1433* (2013.01); *F02D 2200/0616* (2013.01)

(58) Field of Classification Search
CPC ............... F02D 41/182; F02D 41/1401; F02D 41/1454; F02D 2041/1432; F02D 2041/1433; F02D 2200/0616
See application file for complete search history.

(56) References Cited

U.S. PATENT DOCUMENTS 5,023,795 A 6/1991 Matsumura et al.
5,762,043 A * 6/1998 Yoshioka .............. F02D 41/126 477/181
5,983,630 A * 11/1999 Kibe ...................... F02D 41/403 123/305
6,363,313 B1 * 3/2002 Katoh ................. F02D 41/1406 701/104
7,228,221 B2 * 6/2007 Niimi .................. F02D 19/0692 123/339.11
7,412,821 B2 * 8/2008 Araki .................. F02D 41/3094 60/284
9,441,567 B2 * 9/2016 Mahaveera ......... F02D 41/1454
(Continued)

FOREIGN PATENT DOCUMENTS

DE 102007005381 A1 8/2008
WO 9739234 A1 10/1997
WO WO-0050763 A1 * 8/2000 ............. F02M 53/06

*Primary Examiner* — Joseph J Dallo
(74) *Attorney, Agent, or Firm* — NORTON ROSE FULBRIGHT US LLP; Gerard A. Messina

(57) ABSTRACT

A method for adjusting a fuel mass to be injected into an internal combustion engine. The internal combustion engine including an intake tract, at least one cylinder, and an exhaust tract. In the method, an air mass introduced into the internal combustion engine is ascertained and a fuel mass to be injected into the internal combustion engine is determined. An air-fuel ratio in the exhaust tract of the internal combustion engine is determined which is adjusted in time. Based on the time-adjusted air-fuel ratio and the calculated fuel mass to be injected, a first wall film fuel mass is calculated and the fuel mass to be injected is adjusted based on the first wall film fuel mass.

9 Claims, 3 Drawing Sheets

(56) References Cited

U.S. PATENT DOCUMENTS

| | | | | |
|---|---|---|---|---|
| 2001/0037797 | A1* | 11/2001 | Arai | F02D 13/0215 123/480 |
| 2003/0041593 | A1* | 3/2003 | Yoshida | F02D 41/042 60/285 |
| 2003/0163243 | A1* | 8/2003 | Inoue | F02D 41/042 701/112 |
| 2004/0045535 | A1* | 3/2004 | Mezger | F02D 41/047 123/480 |
| 2004/0118385 | A1* | 6/2004 | Katoh | F02D 41/064 123/492 |
| 2004/0181331 | A1* | 9/2004 | Nagaishi | F02D 35/025 60/285 |
| 2006/0207241 | A1* | 9/2006 | Araki | F02M 63/029 60/284 |
| 2008/0022958 | A1* | 1/2008 | I | F02D 41/08 123/179.3 |
| 2010/0126146 | A1* | 5/2010 | Yamamoto | F02D 41/2454 60/286 |
| 2011/0192380 | A1* | 8/2011 | Tomimatsu | F02D 41/1497 123/493 |
| 2012/0298085 | A1* | 11/2012 | Nose | F02D 41/047 123/699 |
| 2014/0372091 | A1* | 12/2014 | Larimore | G06F 30/20 703/2 |
| 2016/0298512 | A1* | 10/2016 | Onoe | B01D 46/2484 |

* cited by examiner

METHOD FOR ADJUSTING A FUEL MASS TO BE INJECTED

CROSS REFERENCE

The present application claims the benefit under 35 U.S.C. § 119 of German Patent Application No. DE 10 2022 203 409.0 filed on Apr. 6, 2022, which is expressly incorporated herein by reference in its entirety.

FIELD

The present invention relates to a method for adjusting a fuel mass to be injected into an internal combustion engine, and to a computing unit and a computer program for carrying out the method.

BACKGROUND INFORMATION

To avoid harmful emissions, it is necessary for fuel injected into an internal combustion engine to also be completely combusted. Such complete combustion requires a stoichiometric air-fuel ratio in the cylinder of the internal combustion engine. This is acquired for example by a lambda sensor in the exhaust tract of the internal combustion engine and is regulated by a so-called lambda control in the engine control device.

However, since the lambda control can react only with a delay during load change processes, due to a measured deviation in the air-fuel ratio (lambda deviation), deviations of the measured lambda value from the stoichiometric air-fuel ratio occur in particular in the transient area. Dynamic feedforward control can ensure that lambda deviations in the transient area are also minimized. In this context, a so-called transition compensation can be used.

German Patent Application No. DE 10 2007 005 381 A1 describes a method for adjusting a transition compensation in an internal combustion engine, in which fuel is injected into an intake manifold according to a corrected injection amount to form an air-fuel mixture that is supplied to a combustion chamber of an internal combustion engine, an injection amount corresponding to an air mass in the combustion chamber being supplied with a compensation amount in order to obtain the corrected injection amount.

The transition compensation has to be carefully adjusted at a multiplicity of operating points. This is usually done on only a few vehicles during the application phase of the control device. Due to component tolerances in the fleet and to aging effects, in practice the situation arises that the transition compensation adjusted in this way does not correct the transient lambda deviations in the best possible way for every vehicle and at all times.

SUMMARY

According to the present invention, a method for adjusting a fuel mass to be injected into an internal combustion engine, as well as a computing unit and a computer program for carrying out the method, are provided. Advantageous example embodiments of the present invention are disclosed herein.

With the method according to an example embodiment of the present invention, a so-called transition compensation, which is used to adjust the fuel mass in particular during load changes of the engine, can be adjusted and tracked during operation of a vehicle. During the development phase, the application outlay can be reduced with the aid of the method, and during running operation of a vehicle the present invention ensures that the stoichiometric air-fuel ratio is reliably maintained even during load change processes, thus reliably minimizing transient mixture deviations.

The internal combustion engine includes an intake tract, at least one cylinder, and an exhaust tract. Preferably, the internal combustion engine is a gasoline engine with intake manifold injection, i.e., fuel is injected into the intake tract of the engine. Particularly preferably, gasoline is injected into the intake tract of the gasoline engine.

The present invention is based on the measure of determining a correction value for the fuel mass to be injected by determining the combusted fuel mass and comparing it to the injected fuel mass. Any difference between these values is assigned to the actual wall film mass, on the basis of which the fuel mass to be injected or a wall film mass otherwise determined in the system can then be corrected. The mass of fuel combusted is preferably determined from the air mass supplied and the current measured lambda value, it being preferably further taken into account that the measured current lambda value is associated with a fuel mass injected a certain time earlier. Whenever a mass is mentioned here or in the following, this is always meant to also include a mass flow, i.e., a mass per time unit.

Specifically, according to an example embodiment of the present invention, an air mass introduced into the at least one cylinder of the internal combustion engine is ascertained. An air mass “introduced” into the internal combustion engine is to be understood as an air mass suctioned in by the internal combustion engine and/or an air mass conveyed into the internal combustion engine by a compressor. The air mass can be measured for example with a hot film air mass meter (HFM) mounted in the intake tract of the internal combustion engine, or can be determined using a pressure measured in the intake tract upstream of an inlet valve of the internal combustion engine. Alternatively or additionally, the air mass can be determined using a mass flow model based on a position of a throttle valve situated in the intake tract. In addition, a fuel mass to be injected into the combustion engine is determined. Corresponding determination or calculation functions are sufficiently known in this technical area.

Air and fuel must be fed into the cylinder of the internal combustion engine in a certain ratio so that a complete (stoichiometric) combustion can take place there. The following holds:

$$\lambda = \frac{\dot{m}_{air}}{\dot{m}_{fuel} \cdot L_{st}} \tag{1}$$

where $\lambda$ is the air-fuel ratio, $\dot{m}_{air}$ is the air mass flow, $\dot{m}_{fuel}$ is the fuel mass flow, and $L_{st}$ is the stoichiometric air requirement. For example, the stoichiometric air requirement $L_{st}$ for gasoline is 14.7; i.e., it takes 14.7 kg of air to completely burn 1 kg of gasoline. In this case of stoichiometric combustion, the air-fuel ratio is $\lambda=1$. If there is more fuel than can be burned ($\lambda<1$), the air-fuel mixture is said to be rich, while if there is excess air ($\lambda>1$) the air-fuel mixture is said to be lean.

Based on the ascertained air mass introduced into the at least one cylinder of the internal combustion engine, the actual fuel mass burned for a known air-fuel ratio $\lambda$ can consequently also be determined from equation (1).

The air/fuel ratio in the exhaust tract can be measured for example using a lambda sensor that ascertains the residual oxygen in the exhaust gas and thereupon outputs a voltage signal proportional to the air/fuel ratio. The signal from the lambda sensor is sent to the engine control unit, in which a so-called lambda controller ensures that the air-fuel ratio is accordingly corrected when there are deviations from the specified value, by adjusting the fuel mass in a targeted manner.

In the method according to the present invention, the determined (in particular measured) air-fuel ratio is now used to calculate a first (actual) wall film fuel mass. The term "wall film fuel mass" means a fuel mass stored in or evaporated from a wall film of the intake tract. This wall film arises in that a part of the fuel injected into the intake tract of the internal combustion engine does not enter the cylinder (s) directly, but rather first accumulates on the walls of the intake tract. From there, the fuel evaporates as a function of the operating conditions of the engine (rotational speed, temperature, pressure in the intake tract) and moves into the cylinder or cylinders with a time delay. This wall film fuel mass should expediently be taken into account for each injection, i.e. either more or less should be injected depending on the operating point than would result from the air mass according to equation (1). In particular, the wall film effect comes to bear during load change processes. For example, load reduction by closing the throttle valve leads to a reduction in the intake manifold pressure, which promotes evaporation of the fuel mass stored in the wall film. Consequently, in this case more fuel enters the cylinder than was injected in the current working cycle. Since lambda control is too slow to correct such wall film effects, these effects can be corrected for example on the basis of a wall film model, using dynamic feedforward control.

In the context of the present invention, the current wall film fuel mass can always be taken into account. If a wall film fuel mass is already used in the system, e.g., a wall film fuel mass determined using the wall film model, which is also referred to as a second wall film fuel mass, this can be adjusted/corrected using the measured air-fuel ratio. For this purpose, the measured air-fuel ratio is first adjusted temporally, or on the time scale, i.e., a time delay is taken into account that results from the fact that the air-fuel ratio is first determined only in the exhaust tract and not already in the cylinder of the combustion engine with a real measuring device, such as a lambda probe. Using the measured and time-adjusted air-fuel ratio $\lambda_{corr}$ the first wall film fuel mass $\dot{m}_{wf,1}$ can be determined as follows:

$$\dot{m}_{wf,1} = \frac{\dot{m}_{air}}{\lambda_{corr} \cdot L_{st}} - \dot{m}_{direct} \tag{2}$$

Here, $\dot{m}_{direct}$ denotes the currently injected fuel mass flow. This means that the fuel mass ascertained from the measured and time-adjusted air-fuel ratio $\lambda_{corr}$ (i.e., the mass actually burned) can be compared with the injected fuel mass $\dot{m}_{direct}$ and the first wall film fuel mass $\dot{m}_{wf,1}$ can be determined from the difference between the two quantities. Depending on the sign resulting from the difference formation, this may be a fuel mass that is initially stored in the wall film ($\dot{m}_{wf,1}<0$) or a fuel mass that evaporates from the wall film ($\dot{m}_{wf,1}>0$).

Based on the first wall film fuel mass calculated, for example using equation (2), the calculated fuel mass to be injected is adjusted. In other words, for example a fuel mass calculated for the subsequent work cycle, or in general the future fuel mass flow, can be increased or decreased using the first wall film fuel mass.

Since in modern engine control systems a wall film fuel mass is usually already determined, for example using a wall film model, this determined second wall film fuel mass can be adjusted for a dynamic feedforward controlling on the basis of the first wall film fuel mass. The present invention thus makes it possible to continuously adjust the feedforward-controlled wall film fuel mass based on the measured air-fuel ratio during running operation of a vehicle.

According to an example embodiment of the present invention, preferably, the time deviation of the measured air-fuel ratio is ascertained using a computational model of the exhaust tract.

For this purpose, part of the exhaust tract of the internal combustion engine can be represented computationally, for example by a container model that takes into account the storage behavior of an exhaust gas line between an exhaust valve of the engine and a position at which the air-fuel ratio is measured.

The latter is preferably the position of a measuring means, e.g. a lambda probe, in the exhaust tract. In addition to the storage behavior of the exhaust gas line, the response behavior of the measuring means is also preferably taken into account when ascertaining the time deviation of the measured air-fuel ratio.

Both model parameters are a function of the respective operating point of the engine (e.g. are a function of the engine rotational speed).

According to a preferred specific embodiment of the present invention, using the exhaust tract model, the time deviation of the measured air-fuel ratio is divided into a dead time caused by the exhaust tract and a time delay caused by the determination (in particular an LTI transmission behavior) of the measured air-fuel ratio. The dead time can here be assigned to the dwell time of the exhaust gas in the exhaust line, for example between the exhaust valve and the lambda sensor, and the time delay can be assigned to the response behavior of the measuring means.

Preferably, the dead time is adjusted using predetermined characteristic data and/or the time delay is adjusted using a filter transfer function.

The predetermined characteristic data on the basis of which the dead time is compensated can be characteristic curves and/or characteristic maps that are stored in an engine control device. For example, the dead time can be stored in the engine control device on the basis of a characteristic curve that is a function of the exhaust gas mass flow of the engine. This curve can be ascertained on an engine test bench, for example.

To compensate for the time delay due to the response behavior of the measuring means (e.g., PT1 behavior with the time constant $\tau_{exh}$), for example a filter transfer function G(s) can be used according to the following equation (3), which contains the inverse of the delay behavior of the measuring means. To obtain a realizable transfer function G(s) (denominator≠0), the transfer function also contains a delay element with the predetermined filter time constant $\tau_{flt}$.

$$G(s) = \frac{\tau_{exh} \cdot s + 1}{\tau_{flt} \cdot s + 1} \tag{3}$$

Preferably, a second wall film fuel mass is determined using a wall film model. As already explained above, conventional lambda control in the engine control system is too slow to compensate for deviations in the air-fuel ratio due to wall film effects. Therefore, these are preferably corrected on the basis of a wall film model using dynamic feedforward controlling, which adjusts the fuel mass to be injected in a cycle-synchronous manner so that the desired air-fuel ratio can be maintained. The term "cycle-synchronous" is to be understood to mean that the second wall film fuel mass is calculated for each working cycle of the internal combustion engine. Alternatively, the wall film model can be calculated at constant time intervals, for example at intervals of 1 ms or 5 ms.

The wall film model can for example include a map in which a fuel mass situated in the wall film is for example stored as a function of the engine rotational speed and the engine temperature. By forming the time derivative of this fuel mass with a filter transfer function that has a further predetermined filter time constant, the fuel mass flow from the wall film can be determined. In this wall film fuel mass flow, a distinction is made between a portion that flows into the cylinder quickly and a portion that flows into the cylinder with a significant delay. This situation can be mapped using two filter transfer functions connected in parallel, with a slow and a fast predetermined filter time constant.

According to a preferred specific embodiment of the present invention, the second wall film fuel mass is adjusted to the first wall film fuel mass using an adaptation factor in order to compensate for deviations of the modeled second wall film fuel mass from the real wall film fuel mass occurring in an individual vehicle, in particular over the lifetime of the vehicle.

For example, the adaptation factor $f_{corr,adp}$ can be ascertained by dividing the first wall film fuel mass $\dot{m}_{wf,1}$ by the second wall film fuel mass $\dot{m}_{wf,2flt}$ according to equation (4).

$$f_{corr,adp} = \frac{\dot{m}_{wf,1}}{\dot{m}_{wf,2flt}} \quad (4)$$

Here, $\dot{m}_{wf,2flt}$ denotes a second wall film fuel mass that has been synchronized with the first wall film fuel mass $\dot{m}_{wf,1}$ using the predetermined filter time constant $\tau_{flt}$.

However, it is particularly preferred to use a recursive least squares estimator (least squares method) to ascertain the adaptation factor. Using this, the numerical stability of the calculation can be further increased.

A computing unit according to the present invention, e.g., an engine control unit of a motor vehicle, is set up, in particular in terms of programming, to carry out the method according to the present invention.

An internal combustion engine according to the present invention includes an intake tract, at least one cylinder, an exhaust tract, and the computing unit according to the present invention.

The implementation of a method according to the present invention in the form of a computer program or computer program product having program code for carrying out all the method steps is also advantageous, because this results in particularly low costs, especially if an executing control device is used for other tasks and is therefore present anyway. Finally, a machine-readable storage medium is provided having a computer program stored thereon as described above. Suitable storage media or data carriers for providing the computer program are in particular magnetic, optical, and electrical memories, such as hard disks, flash memories, EEPROMs, DVDs, and others. It is also possible to download a program via computer networks (Internet, Intranet, etc.). Such a download can be done in wired or wireless fashion (e.g. via a WLAN network, a 3G, 4G, 5G or 6G connection, etc.).

The present invention makes it possible to adjust and track a transition function for adjusting the fuel mass when there are load changes in the operation of a vehicle. During the development phase, the application outlay can be reduced with the aid of the method of the present invention, and during running operation of a vehicle the present invention ensures that the stoichiometric air-fuel ratio is reliably maintained even during load change processes, thus reliably minimizing transient lambda deviations.

Further advantages and embodiments of the present invention result from the description and the figures.

The present invention is shown schematically in the figures on the basis of an exemplary embodiment and is described below with reference to the figures.

DETAILED DESCRIPTION OF EXAMPLE EMBODIMENTS

Figure 1:
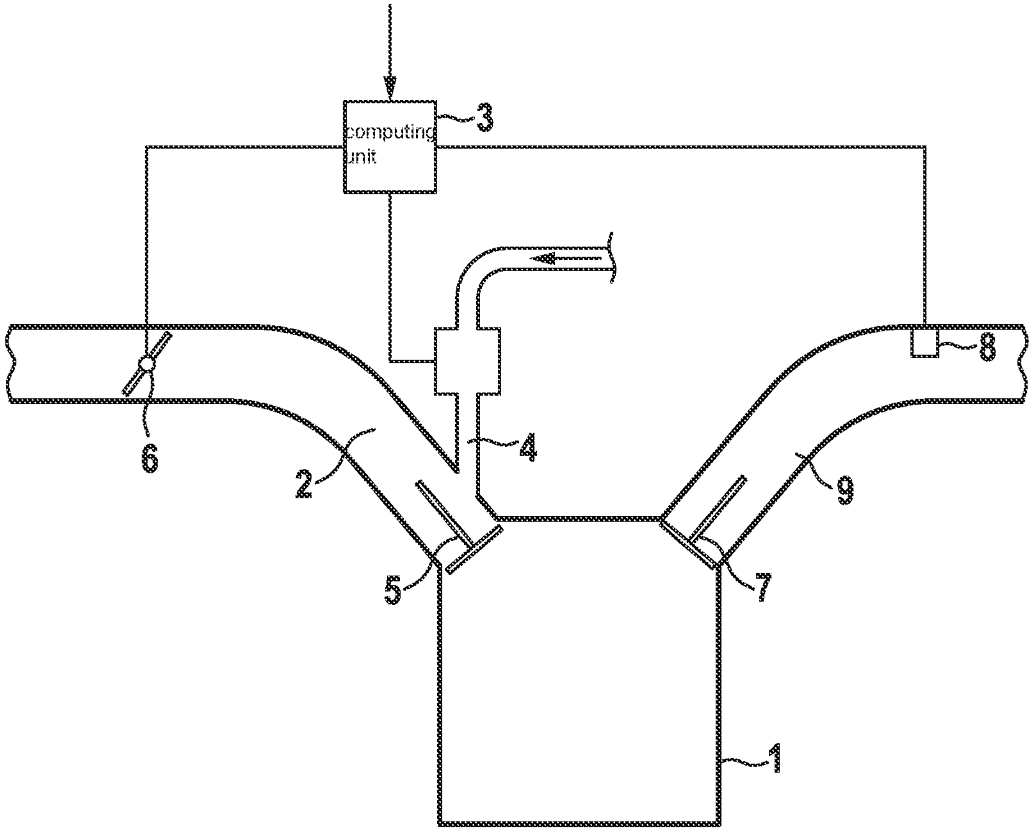
FIG. 1 shows a schematic and sectional view of an internal combustion engine such as may form the basis of a preferred specific embodiment of the present invention.

FIG. 1 shows a schematic and sectional view of an internal combustion engine such as may form the basis of a preferred specific embodiment of the present invention. The internal combustion engine shown has an intake tract 2, a cylinder 1 and an exhaust tract 9. An inlet valve 5 and an outlet valve 7 are situated in cylinder 1, closing cylinder 1 off relative to intake tract 2 and exhaust tract 9. A throttle valve 6 and an injection valve 4 are arranged in intake tract 2. Injection valve 4 injects fuel before intake valve 5. When the intake valve opens, a portion of the injected fuel enters cylinder 1 directly together with the air mass flow passing through throttle valve 6, while the other portion is deposited on the walls of intake tract 2.

A lambda sensor 8 is situated in exhaust tract 9 of the internal combustion engine shown, which sensor determines the residual oxygen in the exhaust gas of the engine in order to determine the air-fuel ratio of the combusted mixture.

In addition, the internal combustion engine includes a computing unit 3, which can for example be the engine control device, which is connected to throttle valve 6, injection valve 4, and lambda sensor 8. Computing unit 3 can receive the signals from the sensors of the combustion engine (e.g. lambda sensor 8) and control the actuators of the combustion engine (e.g. throttle valve 6 and injection valve 4).

Computing unit 3 can, for example, receive the output signal of the lambda probe 8, calculate the first wall film fuel mass based thereon, and adjust the fuel mass to be injected by injection valve 4 accordingly.

From FIG. 1, it is clear that there is a storage volume between exhaust valve 7 and lambda sensor 8, which results in a delayed measurement of the air-fuel mixture in cylinder 1.

Figure 2A:
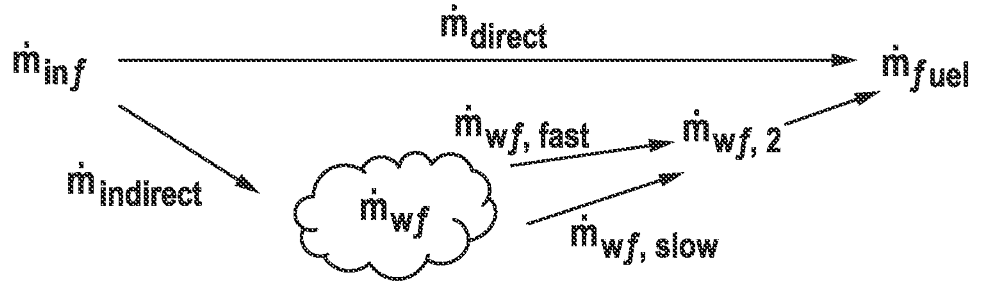
FIGS. 2A and 2B schematically show a wall film model and an exhaust tract model according to a preferred specific embodiment of the present invention.

FIG. 2*a* schematically shows a model for the wall film behavior of the fuel injected into intake tract 2 (wall film model). According to this model, the injected fuel mass flow $\dot{m}_{inj}$ is divided into a portion $\dot{m}_{direct}$, which enters cylinder 1 directly in the current working cycle of the engine, and a portion $\dot{m}_{indirect}$, which is temporarily stored in a wall film 10 and enters cylinder 1 with a time delay as wall film fuel mass $\dot{m}_{wf}$. Based on the fuel properties (faster and slower boiling portions), a distinction is made between a portion $\dot{m}_{wf,fast}$, which evaporates faster from wall film 10 and thus enters cylinder 1 earlier, and a portion $\dot{m}_{wf,slow}$, which evaporates more slowly and enters cylinder 1 later. The fuel mass flow $\dot{m}_{wf}$ evaporating from wall film 10 or stored in the wall film is added to the fuel mass flow $\dot{m}_{direct}$, resulting in the total mass flow $\dot{m}_{fuel}$ entering cylinder 1. Depending on the operating point, more or less fuel is evaporated from wall film 10 or is stored in the wall film. By taking into account the wall film fuel mass flow $\dot{m}_{wf}$ in the engine control unit, the injected fuel mass flow $\dot{m}_{inj}$ is corrected accordingly, and the fuel mass flow $\dot{m}_{fuel}$ that results in a desired air-fuel ratio enters cylinder 1.

The wall film model is standardly adjusted to a limited number of vehicles during the application of the engine controlling. In order to correctly take into account wall film effects over the life of a vehicle and for different vehicles, the advantageous specific embodiment of the present invention described herein includes an adaptation of the wall film fuel mass flow rate calculated using the wall film model $\dot{m}_{wf,2}$, which is described below in connection with FIG. 3.

The adaptation makes use of a measured air-fuel ratio $\lambda_{sens}$ to determine the real fuel mass entering the cylinder. Because the measured signal of the lambda probe $\lambda_{sens}$ reflects the air-fuel ratio λ in the cylinder with a time delay, this time delay has to be taken into account in the adaptation.

Figure 2B:
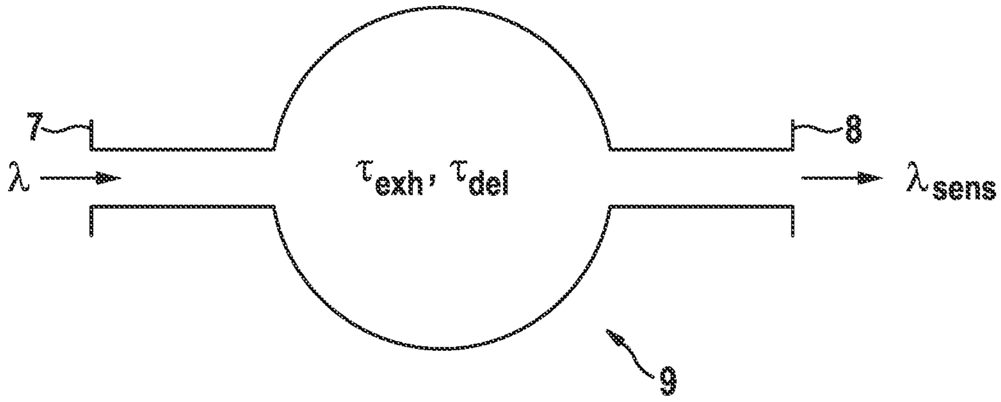

FIG. 2*b* schematically shows an exhaust tract model in which the stretch between exhaust valve 7 and lambda sensor 8 is modeled as a container in order to represent the storage behavior of exhaust tract 2. The air-fuel ratio $\lambda_{sens}$ measured at the lambda sensor 8 has a dead time $\tau_{del}$ and a time delay compared to the air/fuel mixture λ present at the exhaust valve, which is described by a delay function with the time constant $\tau_{exh}$. The dead time $\tau_{del}$ can, for example, be mapped on the basis of a characteristic curve that is a function of the exhaust gas mass flow of the engine, which can be ascertained for example on an engine test bench. Both model parameters $\tau_{del}$ and $\tau_{exh}$ are a function of the operating point of the engine (e.g. of the engine rotational speed).

Figure 3:
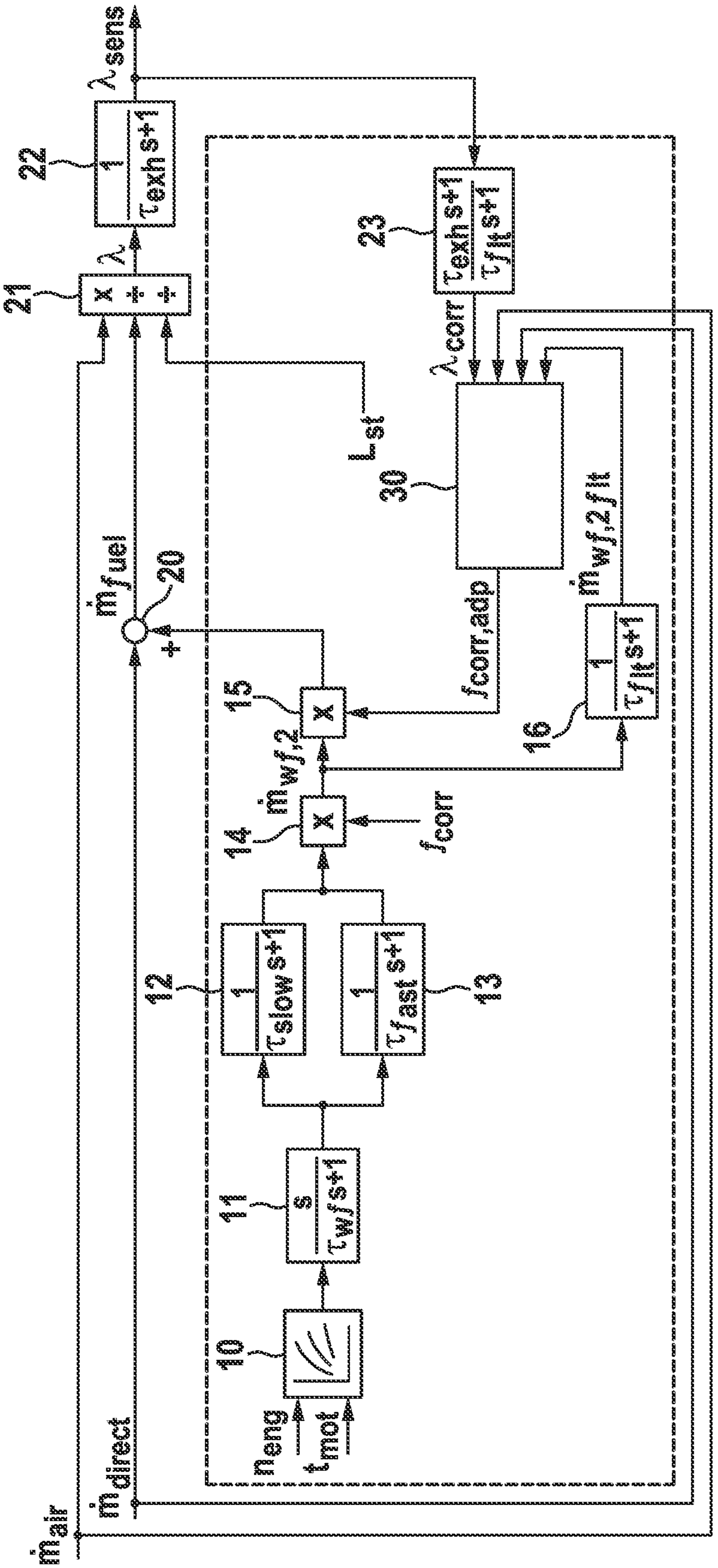
FIG. 3 shows a preferred specific embodiment of a method according to the present invention in a block diagram.

FIG. 3 shows a preferred specific embodiment of the method according to the present invention in a block diagram. Here, function blocks 21 and 22 describe the controlled system, namely the formation and the delayed behavior of the measured air-fuel ratio $\lambda_{sens}$, and function blocks 10 to 16 and 23 and 30 (in the dashed box) describe the feedforward controlling and adaptation of the wall film fuel mass flow $\dot{m}_{wf,2}$.

In function block 21, the air-fuel ratio λ prevailing in cylinder 1 is calculated based on the input variables air mass flow $\dot{m}_{air}$, fuel mass flow $\dot{m}_{fuel}$ and stoichiometric air requirement $L_{st}$. The fuel mass flow $\dot{m}_{fuel}$ entering cylinder 1 is here made up of the fuel mass flow $\dot{m}_{direct}$, which enters the cylinder from the current injection, and the wall film fuel mass flow $\dot{m}_{wf,2}$.

The delayed behavior of the air-fuel ratio $\lambda \rightarrow \lambda_{sens}$ is mapped here by a PT1 element with the time constant $\tau_{exh}$ in function block 22. Because the dead time is considered separately (via a simple shift of the values on the time scale) and is not included in the transfer function 23 for the adaptation model 30, it is not shown in the present block diagram.

Function blocks 10 to 14 show the wall film model for dynamic feedforward control of the wall film fuel mass flow $\dot{m}_{wf,1}$. The fuel mass situated in wall film 10 is preferably stored in the engine control unit in a corresponding map 10 as a function of the engine rotational speed $n_{eng}$ and the engine temperature $t_{mot}$. The input variables of map 10 are not limited to the variables shown; additional or other boundary conditions, such as pressure and/or temperature in intake tract 2 of the engine, can be taken into account.

Function block 11 describes a filter transfer function with a filter time constant $\pi_{wf}$, that calculates the wall film fuel mass flow using the time derivative of the wall film fuel mass. The wall film fuel mass flow calculated in this way is subsequently divided into a portion that flows into the cylinder quickly and a portion that flows into the cylinder with a significant delay. This is realized by two function blocks 12 and 13 connected in parallel, which have filter transfer functions with a slow time constant $\tau_{slow}$ and a fast time constant $\tau_{fast}$.

Because, in addition to the above-described functional dependence of the wall film behavior on the engine rotational speed and the engine temperature, there may be other dependencies in the fuel mass flow (e.g. a directional dependence of the mass flow entering or exiting the wall film), the fuel mass flow resulting from function blocks 12 and 13 is advantageously multiplied again here by a correction factor $f_{corr}$, by a multiplier 14.

This block 10 to 14 is usually not individually parameterized for the specific engine, so that the determined second wall film fuel mass flow $\dot{m}_{wf,2}$ is not (always) optimal.

Therefore, advantageously, the determined second wall film fuel mass flow $\dot{m}_{wf,2}$ is now subsequently multiplied by the adaptation factor $f_{corr,adp}$, which is ascertained in function block 30 from, inter alia, the measured and time-adjusted air-fuel ratio $\lambda_{corr}$. This multiplication at the multiplier 15 results in the first (positive or negative) wall film fuel mass flow $\dot{m}_{wf,1}$, which is added to the fuel mass flow $\dot{m}_{direct}$ at the addition point 20.

In function block 30, the calculation of the adaptation factor $f_{corr,adp}$, inter alia, is carried out also using the first wall film fuel mass flow rate $\dot{m}_{wf,1}$, which however is calculated differently than in 15. The first wall film mass flow rate $\dot{m}_{wf,1}$ can be calculated for example according to equation (2), and the adaptation factor $f_{corr,adp}$ can be calculated therefrom, for example according to equation (4). The adaptation factor $f_{corr,adp}$ can preferably also be determined using a recursive least squares estimator, which increases the numerical stability of the calculation.

In order to perform the calculation steps according to equations (2) and (4), function block 30 receives the measured and time-adjusted air ratio $\lambda_{corr}$, the air mass flow $\dot{m}_{air}$, the fuel mass flow $\dot{m}_{direct}$, and the filtered wall film mass flow $\dot{m}_{wf,2flt}$, ascertained from the wall film model, as input variables.

For the temporal adjustment of the measured air-fuel ratio $\lambda_{sens}$ to the air ratio λ present in the cylinder, the filter transfer function shown in function block 23 and described in equation (3) is used. This produces the time-adjusted air ratio $\lambda_{corr}$, which is used in function block 30 to calculate the first wall film fuel mass flow $\dot{m}_{wf,1}$ according to equation (2).

From a comparison of function blocks 22 and 23, it can be seen that the filter transfer function shown in function block 23 is the inverse of the time delay of the measured air-fuel ratio $\lambda_{sens}$ shown in function block 22. In addition, the transfer function 23 has in the denominator a further filter function with the predetermined time constant $\tau_{flt}$.

The time constant $\tau_{flt}$ is used in the same way to filter the first wall film fuel mass flow $\dot{m}_{wf,2}$ in function block 16, so that the input variables $\dot{m}_{wf,2flt}$ and $\lambda_{corr}$ enter function block 30 synchronously in time, which block has the adaptation factor $f_{corr,adp}$ as output variable.

With the help of the adaptation factor calculated in function block 30, for example on the basis of equations (2) and (4), the wall film fuel mass flow can be continuously adjusted to the real engine conditions during vehicle operation. In this way, the stoichiometric air-fuel ratio can be reliably maintained even during load change processes, and transient mixture deviations can thus be reliably minimized.

What is claimed is:

1. A method for adjusting a fuel mass to be injected into an internal combustion engine, the internal combustion engine including an intake tract, at least one cylinder, and an exhaust tract, the method comprising the following steps:

ascertaining an air mass introduced into the at least one cylinder of the internal combustion engine;

determining a fuel mass to be injected into the at least one cylinder of the internal combustion engine;

measuring using a lambda sensor an air-fuel ratio in the exhaust tract of the internal combustion engine;

temporally adjusting the measured air-fuel ratio to obtain a time-adjusted air-fuel ratio, wherein the temporal adjustment of the measured air-fuel ratio is ascertained based on a model of the exhaust track which takes into account a storage behavior of an exhaust gas line between an exhaust valve of the internal combustion engine and a position at which the air-fuel ratio is measured by the lambda sensor, and based on a response behavior of the lambda sensor;

determining a first wall film fuel mass based on the time-adjusted air-fuel ratio, the ascertained introduced air mass, and the determined fuel mass to be introduced; and adjusting the fuel mass to be injected based on the calculated first wall film fuel mass.

2. The method as recited in claim 1, wherein the adjusting of the fuel mass to be injected based on the calculated first wall film fuel mass includes a determination of an adaptation factor from the first wall film fuel mass and a second wall film fuel mass, the second wall film fuel mass being determined using a wall film model, wherein the second wall film fuel mass is adjusted using the adaptation factor, and wherein the adjusting of the fuel mass to be injected is based on the adjusted second wall film fuel mass.

3. The method as recited in claim 2, wherein a least squares estimator is used for the ascertaining of the adaptation factor.

4. A computing unit configured to adjust a fuel mass to be injected into an internal combustion engine, the internal combustion engine including an intake tract, at least one cylinder, and an exhaust tract, the computing unit configured to:

ascertain an air mass introduced into the at least one cylinder of the internal combustion engine;

determine a fuel mass to be injected into the at least one cylinder of the internal combustion engine;

measure using a lambda sensor an air-fuel ratio in the exhaust tract of the internal combustion engine;

temporally adjust the measured air-fuel ratio to obtain a time-adjusted air-fuel ratio, wherein the temporal adjustment of the measured air-fuel ratio is ascertained based on a model of the exhaust track which takes into account a storage behavior of an exhaust gas line between an exhaust valve of the internal combustion engine and a position at which the air-fuel ratio is measured by the lambda sensor, and based on a response behavior of the lambda sensor;

determine a first wall film fuel mass based on the time-adjusted air-fuel ratio, the ascertained introduced air mass, and the determined fuel mass to be introduced; and adjust the fuel mass to be injected based on the calculated first wall film fuel mass.

5. An internal combustion engine, comprising:

an intake tract;

at least one cylinder;

an exhaust tract; and a computing unit configured to adjust a fuel mass to be injected into the internal combustion engine, the computing unit configured to:

ascertain an air mass introduced into the at least one cylinder of the internal combustion engine;

determine a fuel mass to be injected into the at least one cylinder of the internal combustion engine;

measure using a lamda sensor an air-fuel ratio in the exhaust tract of the internal combustion engine;

temporally adjust the measured air-fuel ratio to obtain a time-adjusted air-fuel ratio, wherein the temporal adjustment of the measured air-fuel ratio is ascertained based on a model of the exhaust track which takes into account a storage behavior of an exhaust gas line between an exhaust valve of the internal combustion engine and a position at which the air-fuel ratio is measured by the lambda sensor, and based on a response behavior of the lambda sensor;

determine a first wall film fuel mass based on the time-adjusted air-fuel ratio, the ascertained introduced air mass, and the determined fuel mass to be introduced; and adjust the fuel mass to be injected based on the calculated first wall film fuel mass.

6. A non-transitory machine-readable storage medium on which is stored a computer program for adjusting a fuel mass to be injected into an internal combustion engine, the internal combustion engine including an intake tract, at least one cylinder, and an exhaust tract, the computer program, when executed by a processor, causing the processor to perform the following steps:

ascertaining an air mass introduced into the at least one cylinder of the internal combustion engine;

determining a fuel mass to be injected into the at least one cylinder of the internal combustion engine;

measuring using a lamda sensor an air-fuel ratio in the exhaust tract of the internal combustion engine;

temporally adjusting the measured air-fuel ratio to obtain a time-adjusted air-fuel ratio, wherein the temporal adjustment of the measured air-fuel ratio is ascertained based on a model of the exhaust track which takes into account a storage behavior of an exhaust gas line between an exhaust valve of the internal combustion engine and a position at which the air-fuel ratio is measured by the lambda sensor, and based on a response behavior of the lambda sensor;

determining a first wall film fuel mass based on the time-adjusted air-fuel ratio, the ascertained introduced air mass, and the determined fuel mass to be introduced; and adjusting the fuel mass to be injected based on the calculated first wall film fuel mass.

7. The computing unit according to claim 4, wherein the adjusting of the fuel mass to be injected based on the calculated first wall film fuel mass includes a determination of an adaptation factor from the first wall film fuel mass and a second wall film fuel mass, the second wall film fuel mass being determined using a wall film model, wherein the second wall film fuel mass is adjusted using the adaptation factor, and wherein the adjusting of the fuel mass to be injected is based on the adjusted second wall film fuel mass.

8. The internal combustion engine according to claim 5, wherein the adjusting of the fuel mass to be injected based on the calculated first wall film fuel mass includes a determination of an adaptation factor from the first wall film fuel mass and a second wall film fuel mass, the second wall film fuel mass being determined using a wall film model, wherein the second wall film fuel mass is adjusted using the adaptation factor, and wherein the adjusting of the fuel mass to be injected is based on the adjusted second wall film fuel mass.

9. The non-transitory machine-readable storage medium according to claim 6, wherein the adjusting of the fuel mass to be injected based on the calculated first wall film fuel mass includes a determination of an adaptation factor from the first wall film fuel mass and a second wall film fuel mass, the second wall film fuel mass being determined using a wall film model, and wherein the second wall film fuel mass is adjusted using the adaptation factor, and wherein the adjusting of the fuel mass to be injected is based on the adjusted second wall film fuel mass.

* * * * *